June 20, 1967 R. J. PERRONE 3,326,869
SILICONE-RUBBER, POLYETHYLENE COMPOSITION; HEAT
SHRINKABLE ARTICLES MADE THEREFROM
AND PROCESS THEREFOR
Filed Aug. 5, 1963

INVENTOR.
ROSARIO J. PERRONE
BY
V. F. Volk
HIS AGENT

United States Patent Office 3,326,869
Patented June 20, 1967

3,326,869
SILICONE-RUBBER, POLYETHYLENE COMPOSITION; HEAT SHRINKABLE ARTICLES MADE THEREFROM AND PROCESS THEREFOR
Rosario J. Perrone, Marion, Ind., assignor, by mesne assignments, to Anaconda Wire and Cable Company, a corporation of Delaware
Filed Aug. 5, 1963, Ser. No. 299,781
3 Claims. (Cl. 260—82.7)

My invention relates to compositions and articles comprising silicone-rubber and particularly to such compositions and articles that are heat shrinkable.

Considerable commercial utility has been found for rubberlike compounds that can be formed into an article, such as a length of tubing, having a certain size or diameter, and then caused to shrink down to another size by some simple process such as the application of heat. A particular application for such compounds occurs in sleeves to be fitted over splices in electrical conductors and then shrunken down to form a continuous insulated covering over the splices and the conductor insulations. It is an essential feature of such articles that they retain their unshrunk dimensions indefinitely until they are deliberately shrunken and that they shrink in a predictable manner with a high degree of reliability when they are treated in the prescribed manner. Materials that are known to be shrinkable may shrink so slowly that they cannot be utilized commercially or the temperature required for shrinking may be so high that the possible fields of utilization are severely limited.

Although a number of materials have been known to be heat shrinkage among which may be included polyester resins and polyvinylchloride, this property is lacking in known formulations of silicone-rubbers. As used in commerce and in this application the term silicon-rubber refers to polymethylphenylsiloxane and polymethylvinylsiloxane. These rubbers are characterized by a wide temperature range of serviceability, extending from −100° F. to 600° F., and by resistance to ozone that has particular advantage in electrical applications. Although known silicone-rubber compositions do not have the desired property of controlled shrinkability, I have discovered that when these rubbers are blended with 15–25% of polyethylene a composition results that does have this property. My silicone-rubber composition can be molded or extruded to a selected dimension, heated and stretched, cooled in the stretched condition, and subsequently heated to shrink to selected dimensions. Prior to heating an article made from my composition will retain its stretched shape indefinitely.

It is an object of my invention to make a heat-shrinkable silicone-rubber composition.

It is a further object of my invention to make a heat-shrinkable composition serviceable over a wide temperature range.

It is a further object of my invention that the shrinkage of my composition shall occur at a moderately low temperature but not at room temperature.

It is a further object of my invention to make a composition wherein shrinkage shall be accomplished in a short length of time.

Very surprisingly, I have found that the silicone-polyethylene composition is serviceable at very high temperatures in spite of the known temperature limitations of polyethylene. Silicone-rubber and polyethylene are not known in the art to be compatible and it is not possible to blend the polyethylene resin into the rubber by conventional methods. I have, however, discovered that if the polyethylene is in the form of a very fine powder, no larger than 200 mesh it can be satisfactorily blended into the silicone-rubber on a cold mill. I prefer to use the 250 mesh product known as Microthene 608 supplied by the U.S. Industrial Chemicals Co. I have further found that coloring matter or pigment, such as carbon black, can be added in small amounts without deleterious effect on my shrinkable composition. Known types and proportions of curing agents, such as dibenzyl peroxide, are also added so that a composition of my invention may be comprised of:

| | Parts by wt. |
|---|---|
| Silicone-rubber | 100 |
| Pigment | 0–5 |
| Polyethylene | 15–25 |
| Curing agent | 0.5–5 |

A composition that I prefer because of its excellent aging properties and processibility is comprised of:

Example I

| | Parts by wt. |
|---|---|
| Silicone-rubber | 100 |
| Pigment (carbon black) | 1.00 |
| Polyethylene | 20.0 |
| Dibenzyl peroxide | 2.0 |

A more thorough understanding of my invention may be gained from the drawing.

Figure 1:
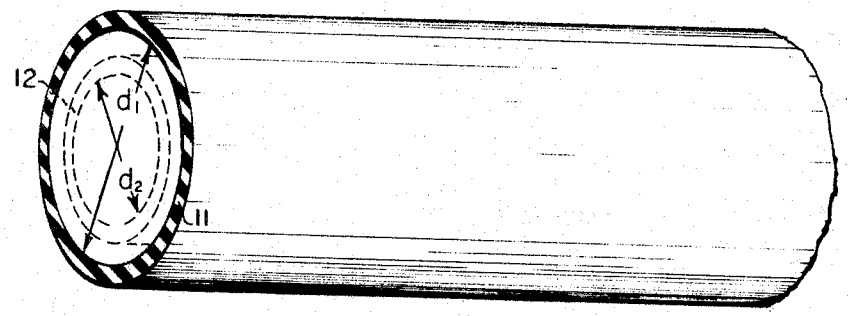
FIGURE 1 is a shrinkable article made from the composition of my invention.

In FIGURE 1 a length of tubing 11 is shown, made from the composition of my invention and capable of being shrunken to a lesser diameter by heating to an appropriate temperature such as 135° C. The tubing 11 has been heated and stretched by means such as the vacuum chamber described in Arnaudin application Serial No. 278,085, filed May 6, 1963, or by other means that are known, and cooled in the stretched condition. It is a feature of the composition of my invention that cooling the stretched tubing to room temperature is sufficient to set it at the stretched dimensions and no special refrigerating means is necessary for storing the stretched tubing. Although FIGURE 1 shows a simple tube formed from my composition, it will be recognized that more complex shapes, such as may be obtained by molding, can also be formed. Upon being heated to a temperature of 135° C. the tubing will shrink to the size of a tubing 12 with a diameter $d_2$.

Figure 2:
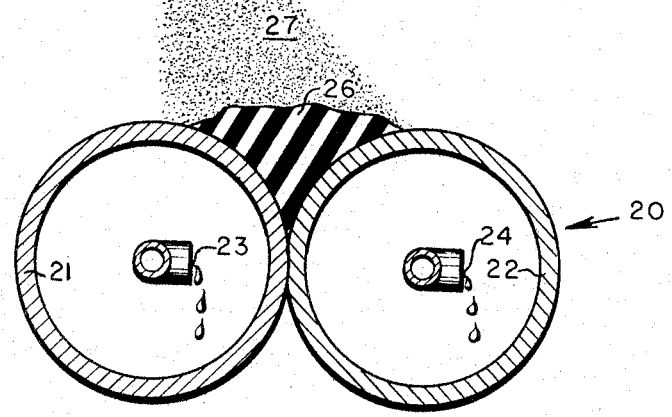
FIGURE 2 is a diagrammatic sectional view of apparatus for the process of my invention.

A representation is made in FIGURE 2 of the method of blending polyethylene which has heretofore been considered incompatible with silicone-rubber into a silicone-rubber compound. A rubber mill 20 having rolls 21, 22 is cooled by means of water internally introduced through pipes 23, 24 and drained in a known manner through other pipes, not shown. A bank of silicone-rubber 26 is worked on the cold rolls and the polyethylene, in the form of a 250 mesh powder 27, is added taking care not to let the temperature rise above 100° F.

The composition of Example I was blended by adding the polyethylene in the form of a 250 mesh powder into the silicone-rubber on a mill with rolls maintained at 70° F. The composition was extruded in the form of tubing and air-cured at 600°–750° F. After cooling, the tubing was reheated to 150° C. and stretched to a diameter approximately twice the original diameter of the tubing. Although I prefer to stretch the tubing at 150° C. I have found that a satisfactory product can be made by stretching between 125°–175° C.

After the tubing had been stretched it was cooled and stored at room temperature. Subsequently, lengths of the stretched tubing were heated to 135° C. for 3 minutes which sufficed to cause them to shrink almost to their original size. For shrinking the tubing I have found that temperatures between 120° and 150° C. are satisfactory. At these temperatures 85–90% of the stretch will be lost in 3–10 minutes. The reshrunk tubing was then tested as follows to obtain the results shown in Table I.

TABLE I

| Property | Test Method MIL-STD-601 | Value |
|---|---|---|
| Tensile Strength | 4111 | 734 p.s.i. |
| Elongation | 4121 | 404%. |
| After heat aging 70 hours at 347° F.: | | |
| Tensile Strength | 4111 | 10.8% increase. |
| Elongation | 4121 | 41.1% decrease. |
| Tear Resistance | 4211 Die B | 132 lb./in. |
| Dielectric Strength | ASTM D-149 | 504 v./mil. |
| Volume Resistivity | ASTM D-257 | $4.18 \times 10^{14}$ ohm-cm. |
| Surface Resistivity | ASTM D-257 | $1.63 \times 10^{14}$ ohm. |

I have invented a new and useful composition, article of manufacture and process for which I desire an award of Letters Patent.

I claim:

1. An article comprising a composition by weight of 100 parts of silicone-rubber selected from the group consisting of polymethylphenylsiloxane and polymethylvinylsiloxane and 15–25 parts of polyethylene, said article being formed and cured to obtain original dimensions and said article being stretched at a temperature of 125–175° C. from said original dimensions to stretched dimensions, said stretched dimensions being stable at room temperature, said article substantially resuming said original dimensions upon being heated.

2. The method of making a shrinkable article comprising the steps of:
    (A) working 15–25 parts of polyethylene powder no coarser than 200 mesh into 100 parts of silicone-rubber comprising a curing agent,
    (B) forming an article from said polyethylene and silicone-rubber,
    (C) heating said article sufficiently to cure said silicone-rubber,
    (D) stretching said article at a temperature of 125–175° C.,
    (E) cooling said article in its stretched condition, said article being shrinkable to substantially its dimensions before stretching, upon being heated.

3. The method of claim 2 wherein said polyethylene is worked into said silicone-rubber at a temperature not exceeding 100° F.

References Cited

FOREIGN PATENTS 843,665 9/1960 Great Britain.
628,814 10/1961 Canada.

MORRIS LIEBMAN, *Primary Examiner.*

J. E. CALLAGHAN, *Assistant Examiner.*

Notice of Adverse Decision in Interference

In Interference No. 96,194 involving Patent No. 3,326,869, R. J. Perrone, SILICONE-RUBBER, POLYETHYLENE COMPOSITION; HEAT SHRINKABLE ARTICLES MADE THEREFROM AND PROCESS THEREFOR, final judgment adverse to the patentee was rendered Apr. 28, 1969, as to claim 1.

[*Official Gazette November 25, 1969.*]

Disclaimer 3,326,869.—*Rosario J. Perrone*, Marion, Ind. SILICONE-RUBBER, POLYETHYLENE COMPOSITION; HEAT SHRINKABLE ARTICLES MADE THEREFROM AND PROCESS THEREFOR. Patent dated June 20, 1967. Disclaimer filed June 10, 1969, by the assignee, *Anaconda Wire and Cable Company.*

Hereby enters this disclaimer to claim 1 of said patent.

[*Official Gazette January 6, 1970.*]